(12) United States Patent
Kobayashi et al.

(10) Patent No.: US 6,744,952 B2
(45) Date of Patent: Jun. 1, 2004

(54) CONNECTING DEVICE FOR CONNECTING AT LEAST TWO OPTICAL WAVEGUIDES, IN PARTICULAR OPTICAL WAVEGUIDES OF DIFFERENT REFRACTIVE INDEX

(75) Inventors: Noboru Kobayashi, Speyer (DE); Steffen Reichel, Mehlingen (DE); Matthias Brinkmann, Nieder-Olm (DE)

(73) Assignee: Schot Glas, Mainz (DE)

( * ) Notice: Subject to any disclaimer, the term of this patent is extended or adjusted under 35 U.S.C. 154(b) by 74 days.

(21) Appl. No.: 10/068,302

(22) Filed: Feb. 8, 2002

(65) Prior Publication Data

US 2003/0185517 A1 Oct. 2, 2003

(51) Int. Cl.[7] .................................................. G02B 6/26
(52) U.S. Cl. .......................................... 385/50; 385/147
(58) Field of Search ............................. 385/50, 52, 88, 385/129, 130, 132, 147

(56) References Cited

U.S. PATENT DOCUMENTS

| | | | |
|---|---|---|---|
| 5,458,528 A | | 10/1995 | Lurie et al. |
| 5,590,229 A | | 12/1996 | Goldman et al. |
| 5,926,593 A | | 7/1999 | Asami et al. |
| 6,014,484 A | * | 1/2000 | Duck et al. .................. 385/34 |
| 6,540,411 B1 | * | 4/2003 | Cheng ........................ 385/79 |
| 6,546,165 B2 | * | 4/2003 | Yoon et al. ................. 385/24 |

FOREIGN PATENT DOCUMENTS

| | | |
|---|---|---|
| EP | 0306243 | 3/1989 |
| EP | 0419699 | 4/1991 |
| JP | 59 038707 | 3/1984 |

OTHER PUBLICATIONS

Patent Abstracts of Japan vol. 008, No. 137 (P–282), Jun. 26, 1984.

* cited by examiner

*Primary Examiner*—Akm Enayet Ullah
(74) *Attorney, Agent, or Firm*—Millen White, Zelano & Branigan, P.C.

(57) ABSTRACT

In order to produce an improved coupling between waveguides of different refractive indexes, provision is made of a connecting device for connecting at least two optical waveguides (5, 6), in the case of which a first optical waveguide (5) is held relative to a second optical waveguide (6), an end face (7, 71, 72) of the first waveguide (5) running obliquely to the optical axis (11) of the first waveguide (5), and an end face (8, 81, 82) of the second waveguide (6) running obliquely to the optical axis of the second waveguide (6). In this case, the refractive index of at least one light-guiding region of the first optical waveguide (5) differs from the refractive index of a light-guiding region of the second optical waveguide (6), and the optical axes of the first and the second optical waveguides (5, 6) are arranged substantially parallel to one another.

27 Claims, 8 Drawing Sheets

Figure 1A:
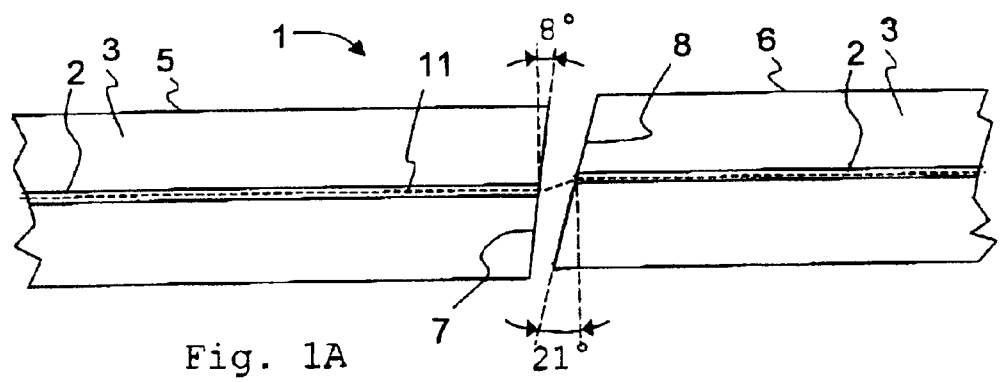

CONNECTING DEVICE FOR CONNECTING AT LEAST TWO OPTICAL WAVEGUIDES, IN PARTICULAR OPTICAL WAVEGUIDES OF DIFFERENT REFRACTIVE INDEX

The invention relates to a connecting device for connecting optical waveguides, in particular for connecting waveguides of different refractive index in a low-reflection fashion.

Glass fiber networks that are distinguished by high data transmission rates play a key role in telecommunication. Optical data telecommunications with the aid of glass fibers require amplifiers at regular intervals for this purpose. The previously used electronic amplifiers with electronic converters are increasingly being replaced in this case by optical amplifiers, in particular by optical fiber amplifiers. It is possible by using such optical devices to implement transmission rates that are higher by several orders of magnitude than the transmission rates that can be realized with the aid of electronic amplifiers.

However, there is the problem in this regard that the core refractive indexes of the optical amplifiers and of the generally used monomode fibers for data transmission differ markedly as a rule. The coupling of fibers of different refractive indexes is attended, however, by undesired effects owing to reflection losses, and by signal distortions and ghost signals owing to multiple reflections. Also particularly disturbing are reflections in or at surfaces of emergence of optical fiber amplifiers, where undesired resonances can occur inside the amplifier because of the reflections. The end faces of the waveguides can be bevelled in order to avoid instances of coupling into the amplifier, that are caused by reflection, and reflection losses, or at least to reduce them.

Such a coupling of waveguides is disclosed, for example, in European Patent EP 0 194 325, in the case of which the fibers to be coupled to one another are ground at the same angle. However, if the fibers have different core refractive indexes, when light is coupled into the second fiber this leads to an angular offset between the optical axis of the output fiber and the optical axis of the input fiber. Consequently, in the case of such an arrangement, the optical axis of the input fiber must run obliquely to the optical output axis. Such arrangements are, however, difficult to adjust and therefore expensive to fabricate.

Again, EP 0 858 976 A2 discloses a device for coupling optical fibers, in the case of which the end faces of glass fibers of different refractive indexes respectively have different lead or grinding angles. Again, in the case of this embodiment of a waveguide connector the glass fibers are coupled to one another in such a way that the end faces of the fibers are aligned parallel to one another. However, the result of this is that the optical axes of the two glass fibers are necessarily at an angle to one another. A substantial outlay on adjustment and mounting also results from these embodiments.

The present invention has therefore addressed the object of providing an improved coupling between waveguides of different refractive indexes. The aim here is not to restrict this solution to fiber amplifiers, but rather that it can be applied for surface waveguides or waveguides in three-dimensional space, for example.

This aim is already achieved in a most surprisingly simple way with the aid of a connecting device for connecting at least two optical waveguides having the features of claim 1.

In the case of the connecting device according to the invention for connecting at least two optical waveguides, a first optical waveguide is held relative to a second optical waveguide, an end face of the first waveguide running obliquely to the optical axis of the first waveguide, and an end face of the second waveguide running obliquely to the optical axis of the second waveguide. The refractive index of at least one light-guiding region of the first optical waveguide differs in this case from the refractive index of a light-guiding region of the second optical waveguide, and the above described problems of the prior art are avoided, since the end face of the first optical waveguide and the end face of the second optical waveguide are inclined such that the optical axis of the first and of the second optical waveguides are arranged substantially parallel to one another.

This particular arrangement of the waveguides permits an extremely simple design of the connecting device according to the invention, in the case of which the waveguides meet one another not obliquely, but in a straight line in the plug-in direction, additionally rendering possible low-reflection coupling of waveguides of different refractive indexes of the light-guiding regions.

The result of this is a lower space requirement by comparison with the coupling with the aid of fibers that meet one another obliquely, particularly also whenever a plurality of connections are to be arranged next to one another. Moreover, axial play between the waveguides, or a slight axial maladjustment is substantially less critical.

It is advantageous for the purpose of low-reflection coupling of optical signals into the second optical waveguide when, furthermore, the connecting device according to the invention is designed in such a way that a wave that is being guided in the first optical waveguide emerges, owing to refraction at the end face of the first optical waveguide, from the first optical waveguide at an angle a obliquely to the optical axis of the first optical waveguide, and enters the second optical waveguide obliquely to the second optical axis of the second optical waveguide and, owing to refraction at the end face of the second optical waveguide, propagates in the second optical waveguide substantially parallel to the optical axis of the second optical waveguide.

This has the advantage, furthermore, of thereby rendering possible a very precise fine adjustment of the fibers. Light exits more obliquely relative to the optical axis owing to the aligned or rectilinear arrangement of the waveguides relative to one another, and to the oblique arrangement of the end faces. Consequently, an axial displacement of the fibers relative to one another causes a displacement of the point where the signal is incident on the fiber, into which the signal is launched again, in the radial direction. However, this displacement is reduced by the factor of the sine of the angle α between the optical axis and the direction of light propagation in the gap between the waveguides. This factor renders an exact fine adjustment possible, since at small angles of the end face normal to the optical axis a relative displacement in the axial direction causes only a radial displacement of the point of incidence that is reduced by this sine factor.

In the connecting device according to the invention, the core of the first optical waveguide preferably has a different refractive index than the core of the second optical waveguide.

It is, moreover, advantageous for the transmission properties of the connecting device in accordance with the present invention when the spacing of the end face of the first optical waveguide from the end face of the second optical waveguide varies in the direction of the optical axis of the first optical waveguide along the direction perpendicular to this optical axis. Disturbing resonance phenomena can be reduced to a large extent by this arrangement. Consequently, ghost signals produced by the varying spacing, in particular by multiple reflection, are further damped.

The invention can be used with particular advantage for coupling optical waveguides with optical amplifiers that generally have a different refractive index than the waveguide for signal transmission. Consequently, in a practical way at least one of the two optical waveguides comprises an optically amplifying material in a practical way for such an embodiment of the connecting device.

The optical waveguide for the optical amplification can, in particular, also have a region doped with rare-earth elements.

In accordance with a preferred embodiment of the invention, the first optical waveguide comprises a fiber waveguide, and the second optical waveguide comprises an amplifier fiber doped with erbium.

For long transmission paths, in particular, quartz glass is particularly suitable as material for the first optical waveguide in the case, for example, of this embodiment, since it is distinguished by particularly low coefficients of absorption for the frequencies usually employed in optical signal transmission. Suitable inter alia for the second optical waveguide are glasses from a group which comprises bismuth oxide-containing glass, tellurite glass, germanium sulfide-containing glass and fluoroaluminate glass. These glasses constitute particularly suitable matrixes for optical amplifier media, in particular for rare earth ions.

In accordance with a further embodiment of the invention, it is provided that the normal to an end face of the first optical waveguide is inclined at 8° to the optical axis of the waveguide. It is preferred in this case that the normal to an end face of the second optical waveguide is inclined at 21° to the optical axis of the waveguide.

According to another embodiment, the normal to an end face of the first optical waveguide is inclined at 31° to the optical axis of the waveguide, and in a preferred development the normal to an end face of the second optical waveguide is inclined, in particular, at 15° to the optical axis of the waveguide.

It is expedient for the different inclinations of the end faces of the waveguides to have the effect that, at least in the region of the cores, the end faces have a minimum spacing from one another that is determined by the dimensions of the guides. Since the coupling losses can rise with increasing spacing of the waveguides from one another, in a preferred development at least one waveguide has one further end face such that the end faces thereof are at an obtuse angle to one another seen from outside. It is thereby possible for the waveguides to be brought closer to one another, and it is ensured that the coupling losses are substantially always minimized. It is therefore advantageous when the end faces of at least one of the two waveguides are arranged at an obtuse external angle to one another.

Thus, for example, it is provided in an embodiment in the case of which the waveguides have a plurality of end faces that the normal to an end face of the first optical waveguide is less than or equal to 15°, and a further end face is inclined at an angle of less than or equal to 21° or 31° to the optical axis of the waveguide.

It is proposed, furthermore, in particular that the normal to an end face of the first optical waveguide is inclined at 21° to the optical axis of the waveguide, the normal to an end face of the second optical waveguide is inclined at 15°, and a further end face of the second waveguide is inclined at an angle of at least 21° to the optical axis.

It is preferably provided in the case of a plurality of end faces of at least one waveguide that the normal to one of the two end faces is inclined at an angle of 21° to the optical axis of the waveguide, the normal to an end face of the other one of the two waveguides additionally or alternatively preferably being inclined by 15° to the optical axis of the waveguide.

The invention also provides that in the case of all embodiments of the connecting device the waveguides can also be coupled to one another via an adapter. The adapter can be used, for example, to adapt the refractive index of the interspace between the end faces, or to influence the shape and intensity distribution of the wave front of the light emerging from one waveguide, for example via a refractive index that varies in the volume of the adapter.

It is provided, furthermore, to design the adapter either with a further waveguide arranged in the latter, or with a channel that couples the waveguide cores to one another and preferably has reflecting walls, in order to reduce coupling losses. This channel can be designed as part of a photonic crystal, and can provide optical properties resembling a waveguide by means of its highly reflecting inner walls.

Since light emerging from one waveguide is propagated in the interspace between the two boundaries at an angle to the optical axis of the waveguide, and can cause an offset perpendicular to the optical axis when impinging on the further waveguide, it is also advantageous in such a case when the core of the first optical waveguide is laterally offset relative to the core of the second optical waveguide.

Moreover, it can be generally advantageous when the end face of at least one of the waveguides is not even. In particular, it is possible by appropriate selection of the shape of the end face to optimize for launching the surface of the phase front and the intensity distribution of the light upon impingement on the waveguide into which the signal is launched again. For example, one of the or a plurality of end faces of at least one of waveguides can be rounded, for example be designed in a concave or convex fashion, be uneven and/or curved. Furthermore, it is advantageous for optimum launching, in particular, when the end faces of the optical waveguides are designed in such a way as to permit the phase front to be preserved in a transition of an optical wave from the first into the second waveguide.

In order for the wave front to propagate in the direction of the optical axis again after launching in the waveguide, it is advantageous, furthermore, when the optical axis of the first waveguide, the optical axis of the second waveguide and the normal vectors to the first and the second end faces of the waveguides lie substantially in one plane. In the case of uneven end faces, the normal vector is to be understood in practical terms here as the normal vector at the location of the end face through which the optical axis of the waveguide runs.

A particularly effective suppression of reflections can be achieved at the waveguide ends when the end faces of the waveguides are coated with an antireflection layer. This also serves, in particular, to optimize the transmission of the arrangement. Moreover, the refractive index effectively acting at the end face can also be influenced or set with the aid of such an antireflection layer.

Figure 1B:
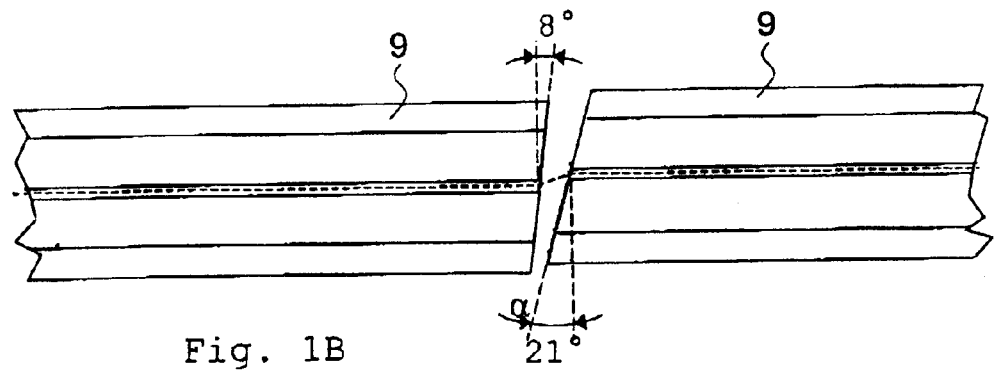
Figure 2:
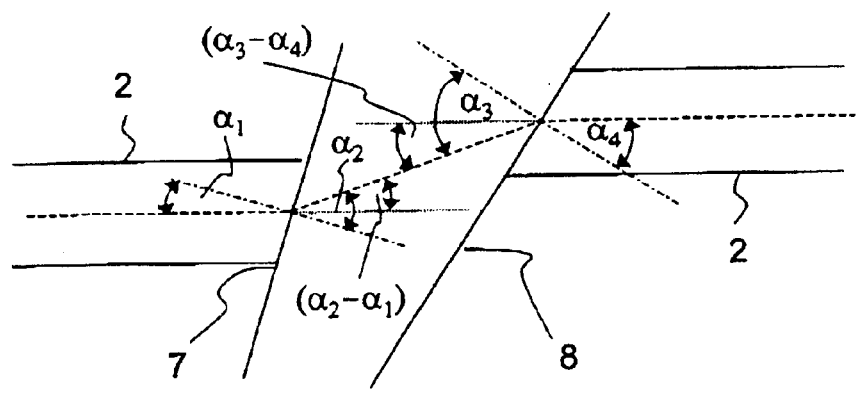
Figure 3A:
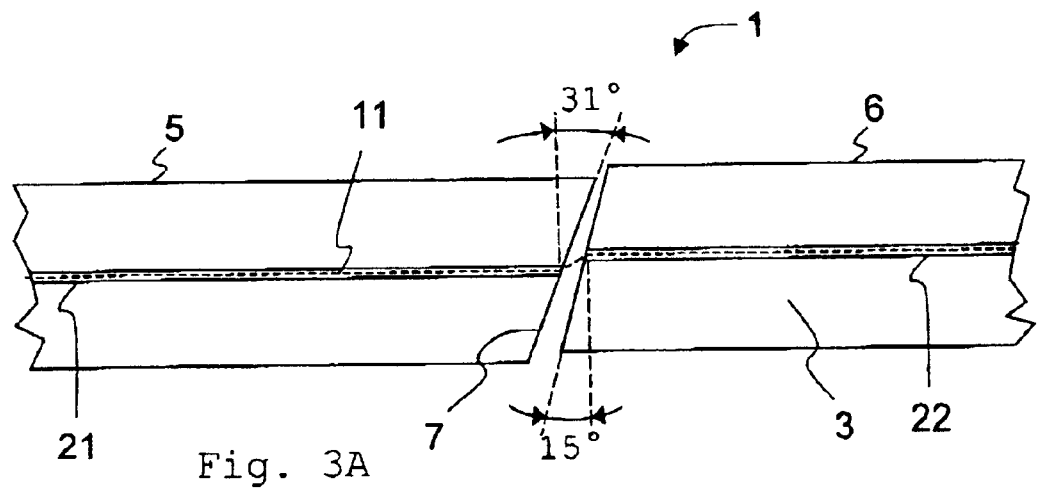
Figure 3B:
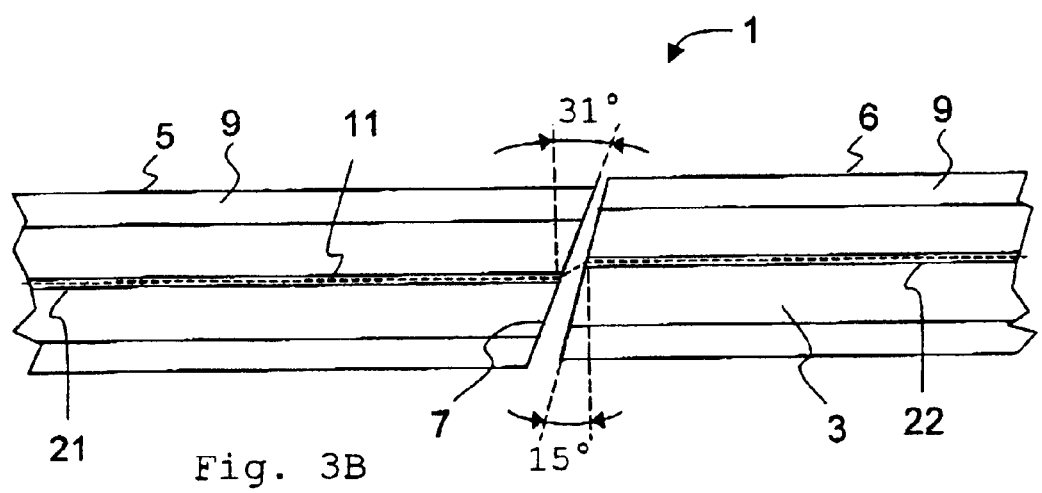
Figure 4A:
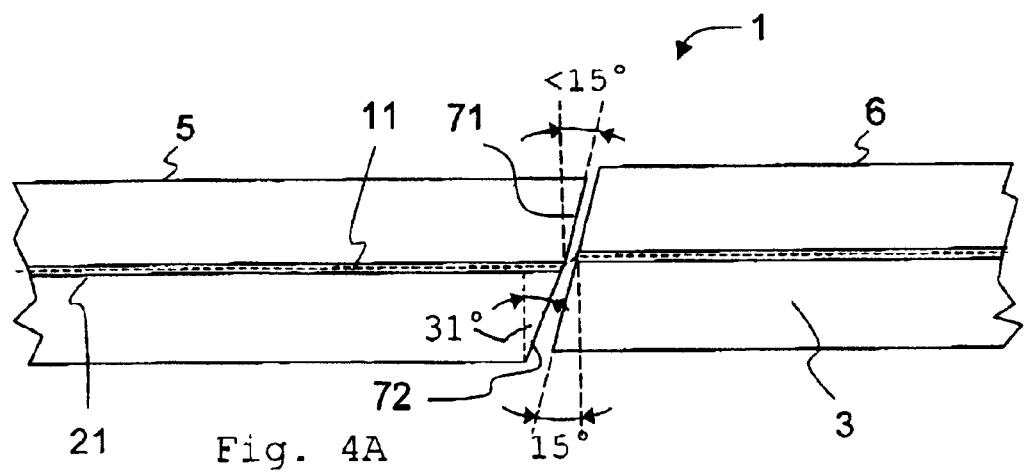
Figure 4B:
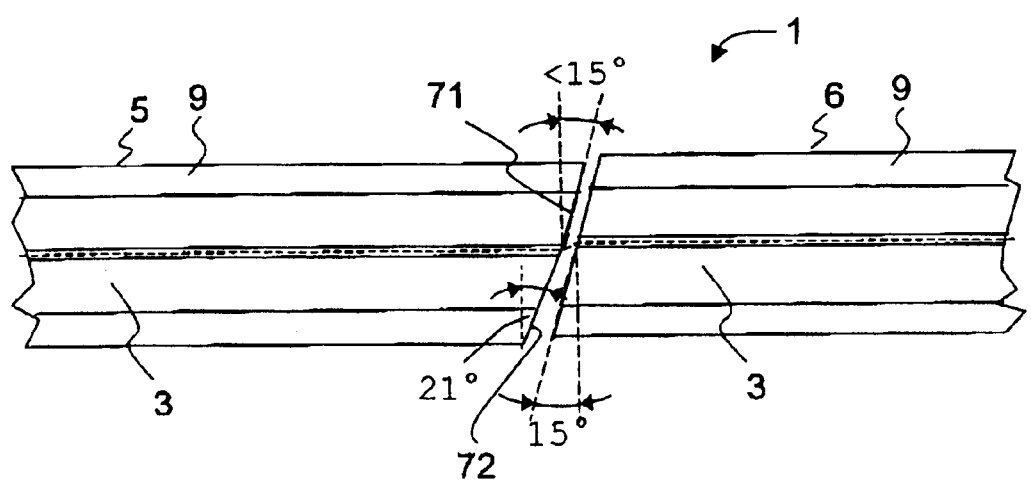
Figure 5A:
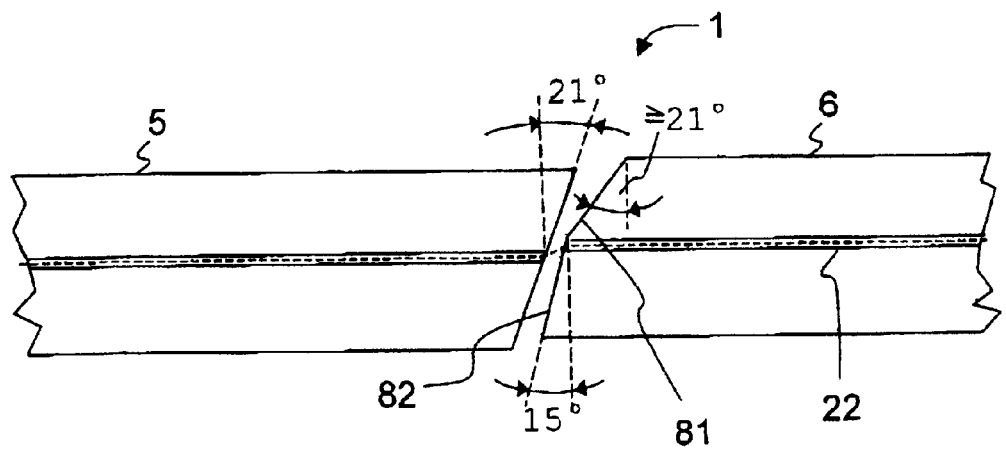
Figure 5B:
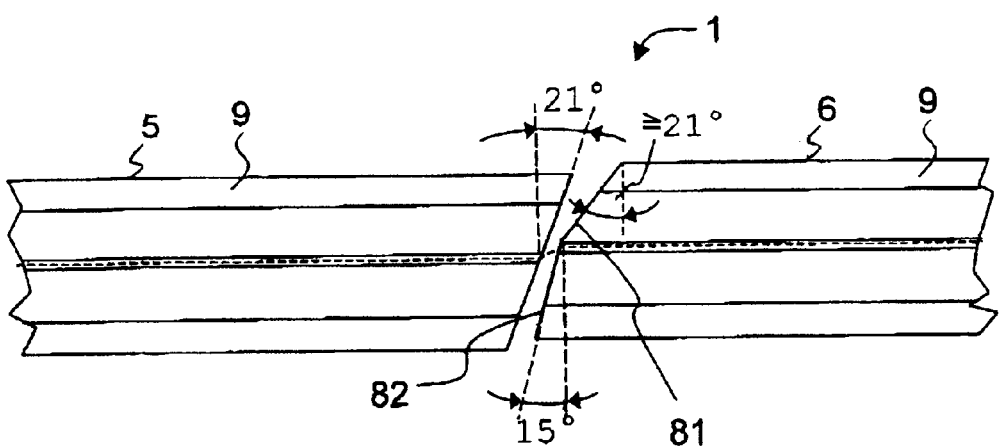
Figure 6:
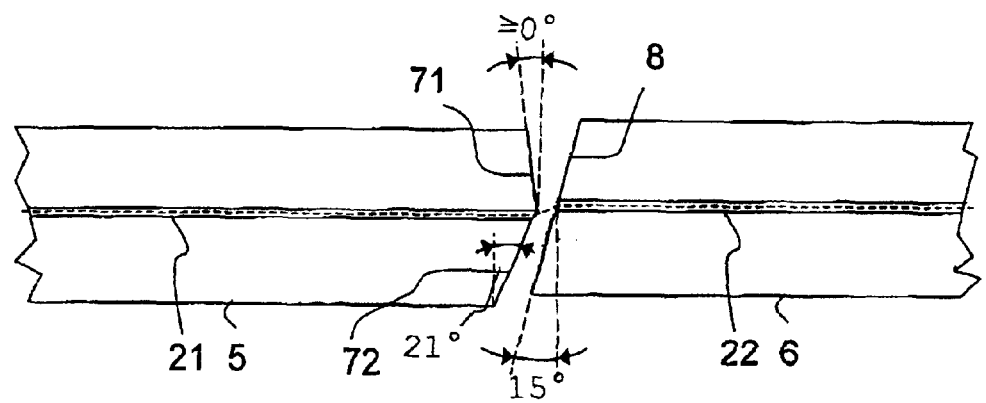
Figure 7:
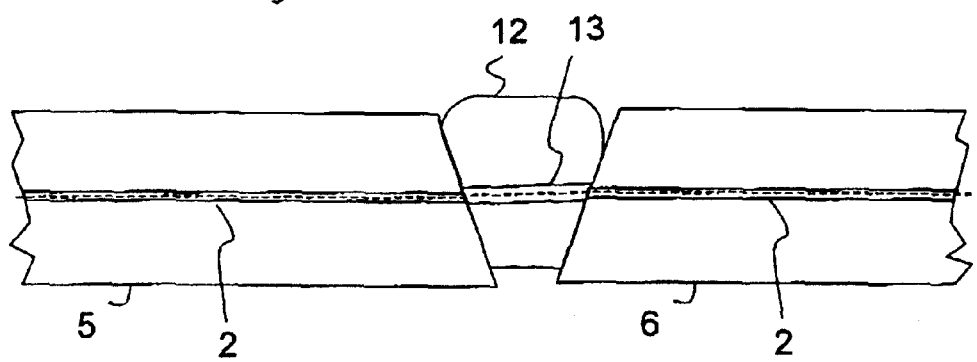
Figure 8:
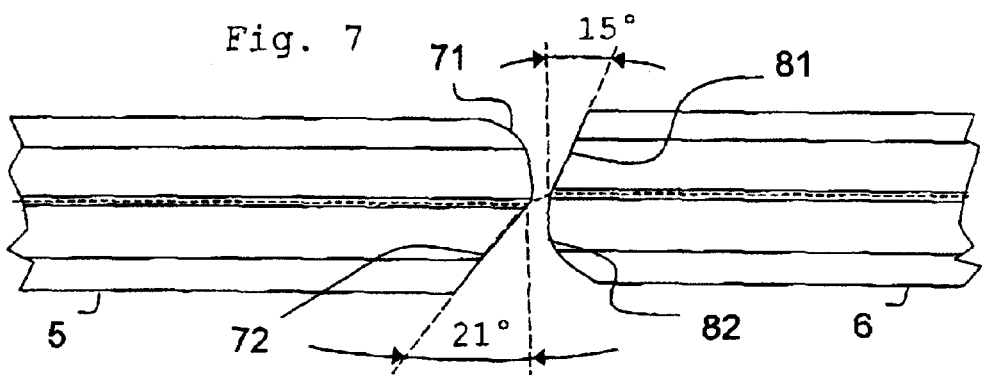
Figure 9:
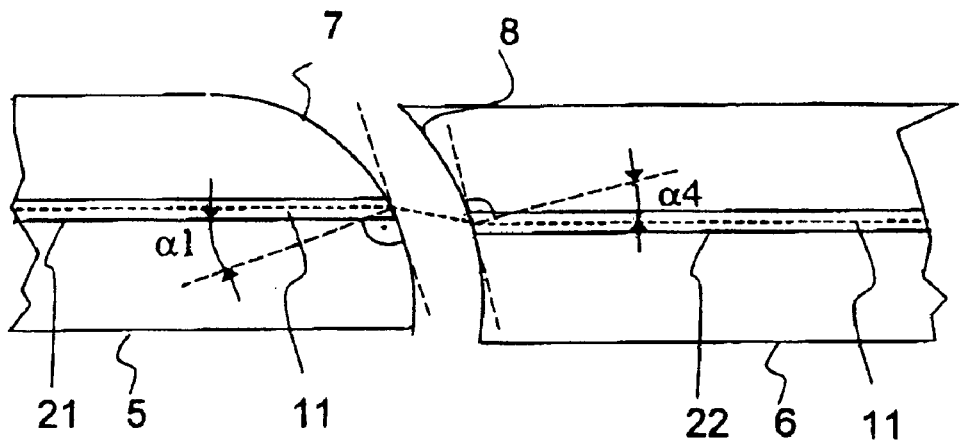
Figure 10:
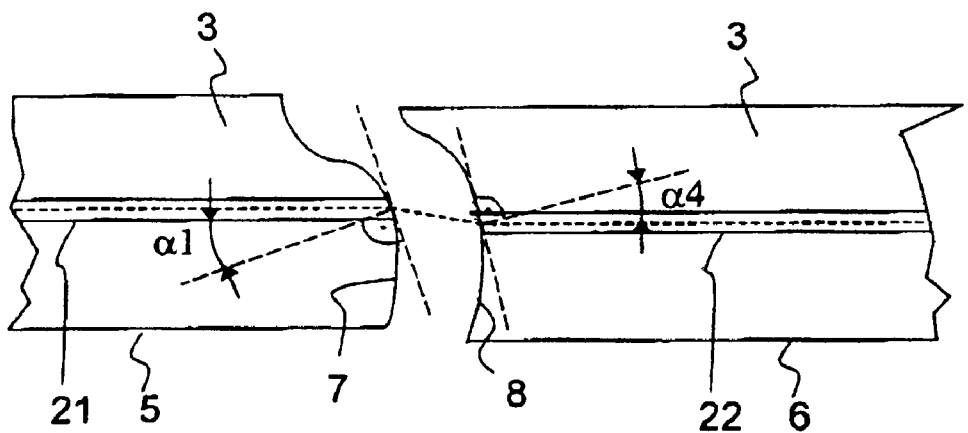
Figure 11:
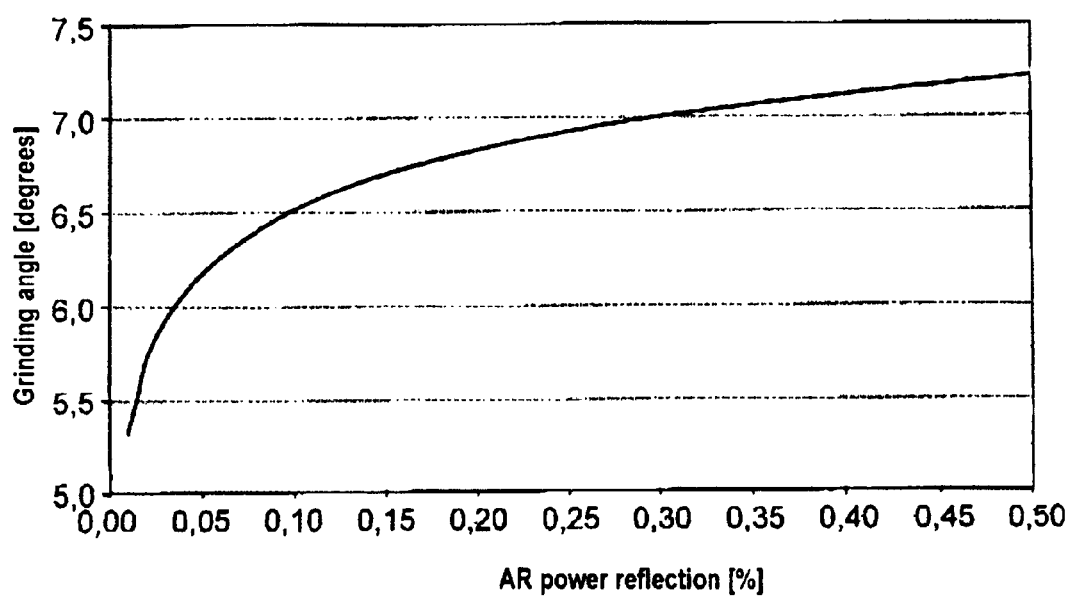
Figure 12:
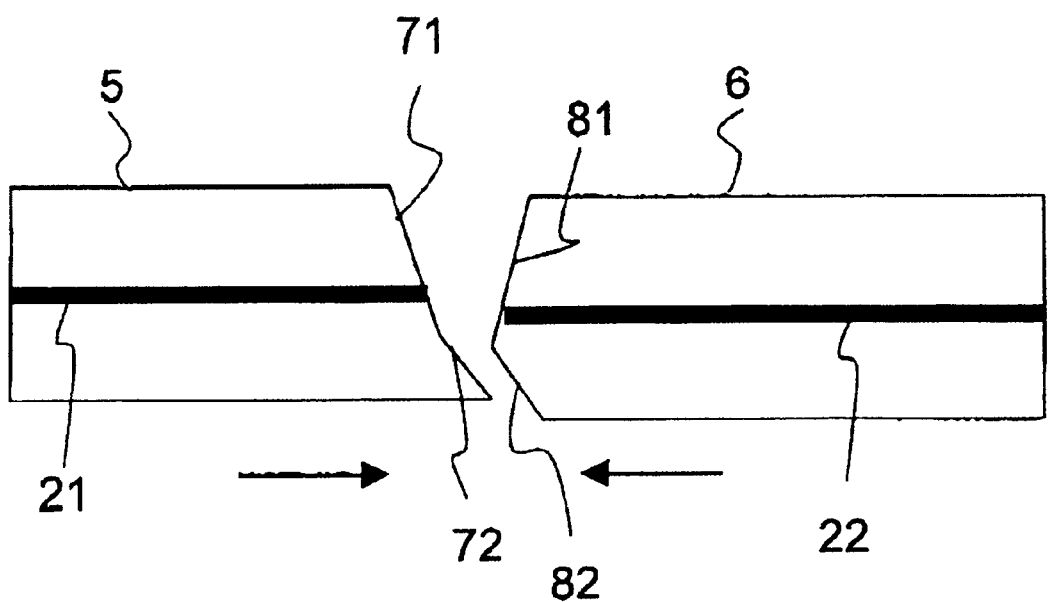

The invention is explained in more detail below with the aid of preferred exemplary embodiments and with reference to the attached drawings, identical reference symbols referring in the individual drawings to identical or similar components. In the drawings:

FIGS. 1A and 1B show two embodiments of the invention with plane end faces of the waveguides, FIG. 2 shows an illustration of the beam path in the connecting device according to the invention, FIGS. 3A and 3B show two further embodiments of the invention with plane end faces of the waveguides, FIGS. 4A and 4B show two embodiments of the invention with a plurality of end faces of a waveguide, FIGS. 5A, 5B, 6 show two further embodiments of the invention with a plurality of end faces of a waveguide, FIG. 7 shows an exemplary embodiment of the invention with an adapter for coupling, FIG. 8 shows an embodiment with additional, rounded end faces, FIG. 9 shows an embodiment with rounded, convex and concave end faces, FIG. 10 shows an embodiment with curved, or uneven boundaries, FIG. 11 shows a graph in which the minimum achievable grinding angle of the waveguide ends is plotted as a function of the power reflection of an antireflection layer, and FIG. 12 shows a further embodiment with a plurality of end faces of both waveguides.

Detailed Description of Preferred Exemplary Embodiments

The following detailed description of preferred exemplary embodiments is not limited to fiber waveguides or fiber amplifiers, although these are also covered. To the extent not otherwise described specifically by way of exception for specific embodiments, the term waveguide defines both fiber waveguides, surface waveguides and also waveguides running in the volume of an optical medium.

FIG. 1A shows a first embodiment of the connecting device 1 with in each case plane end faces 7 and 8 of the waveguides 5 and 6. The waveguides each have a core 2 and a cladding 3. The normal to the end face 7 of the first waveguide 5 assumes an angle of 8° to the optical axis 11 of the waveguide 5. In this embodiment, the normal to the end face 7 of the second waveguide 6 furthermore assumes an angle of 21° to the optical axis of the waveguide 6.

The typical range of accuracy with which angles defined in the case of such a fiber connector in accordance with the invention are to be obtained can be +/−1° and can, moreover, be reduced to approximately +/−0.5° given high-precision fabrication.

The embodiment shown in FIG. 1B differs from the embodiment shown in FIG. 1A by virtue of the fact that the waveguides 5 and 6 are surrounded moreover by an additional ferrule 9 whose refractive index can differ from the material of the respective inner cladding 3.

FIG. 2 shows the beam path along the connecting device. The light runs in the waveguide 5 initially along the optical axis 11. The normal to the end face 7 of the waveguide 5 is tilted by an angle $\alpha_1$ to this optical axis. Because of the Snellius law of refraction, the light is deflected by an angle $\alpha_2$ by comparison with the normal to the end face 7 upon emerging from the first waveguide 5. According to the Snellius law of refraction, it follows for the angles $\alpha_1$, and $\alpha_2$ that:

$$\frac{\sin\alpha_1}{\sin\alpha_2} = \frac{nz}{n1} \quad (1)$$

Here, nz denotes the refractive index of the medium in the interspace between the two boundaries, and n1 the refractive index of the core 2 of the first waveguide 5.

The relationship:

$$\frac{\sin\alpha_3}{\sin\alpha_4} = \frac{n2}{nz}. \quad (2)$$

follows accordingly for the angle $\alpha_3$ concerning the entry of light relative to the normal to the end face 8 of the second waveguide 6, and for the angle $\alpha_4$ concerning the tilting of the normal to the end face 8 in relation to the optical axis of the second waveguide 6 with a refractive index n2 of the core 2 of the first waveguide 6.

So that, as illustrated in the case of FIG. 2, the waveguides can be arranged again in a simple way such that their optical axes can be arranged parallel to one another in accordance with the invention, it is preferably provided that the condition:

$$\alpha_2 - \alpha_1 = \alpha_3 - \alpha_4 \quad (3)$$

is fulfilled in addition.

By substituting the condition (3) and equation (2) in equation (1) it then accordingly follows as a condition for the refractive index n1 that:

$$n1 = \frac{\sin[\arcsin((n2/nz * \sin\alpha_4) - \alpha_4 + \alpha_1]}{\sin\alpha_1} * nz. \quad (4)$$

A refractive index n1 of 2.25 is therefore yielded for the arrangement in accordance with FIGS. 1A, 1B and 2, for example given the use of a waveguide 6 made from quartz glass with a refractive index of n2=1.45, given air as intermediate medium with a refractive index of nz=1, and the angles as used in the exemplary embodiments of FIGS. 1A and 1B. Such a refractive index is achieved, for example, in Chalcogenide glasses such as, for example, As—S-glasses.

If, in a modification of FIGS. 1A, 1B and 2, the end faces 7 and 8 are inclined (FIG. 7) in mutually opposite directions, for example by rotating one of the waveguides 5 and 6 about its optical axis by 180°, the relationship $$\alpha_2 - \alpha_1 = \alpha_3 - \alpha_4 \quad (5)$$

is to be applied expediently instead of condition (3).

Two further embodiments of the connecting device according to the invention are shown in FIGS. 3A and 3B. The embodiment shown in FIG. 3B differs from the embodiment shown in FIG. 3A by virtue of the fact that the claddings of the waveguides 5 and 6 are surrounded in each case by an outer ferrule 9.

In these embodiments, the angle of inclination of the end face is 31° for the waveguide 5, and 15° for the waveguide 6. Substituting a value of $n_1$=1.45, typical of quartz glass waveguides, for the core 22 of the waveguide 6 in the relationship (4), and also air as intermediate medium with a refractive index of nz=1, a value of n2=2.0 results therefrom for the core of the waveguide 5. Such a value is typical, for example, of bismuth oxide-containing glasses or tellurite glasses. These embodiments are therefore particularly suitable for coupling quartz glass telecommunication lines to optical fiber amplifiers such as, for example, EDFAs, based on tellurite glass.

FIGS. 4A and 4B show two embodiments of the invention with a plurality of end faces 71, 72 of the waveguides 5, the waveguides 5 and 6 illustrated in FIG. 4B being surrounded again by an outer ferrule 9, as in FIGS. 1B and 3B.

In detail, in the case of the embodiments shown in FIGS. 4A and 4B, the waveguide 5 has two end faces 71 and 72 whose normals in each case assume different angles of inclination to the optical axis. The angle of inclination with reference to the end face 71 is less than 15° in this case, and the angle of inclination with reference to the end face 72 is 31°, the core 21 of the waveguide 5 being bounded by the end face 72. By contrast, the end of the waveguide 6 has a single end face with an end face inclined by 15°.

FIGS. 5A and 5B show two further embodiments of the invention, the waveguide 6 having two end faces 81 and 82 in this case. By contrast with the embodiments of FIGS. 4A and 4B, the end of the waveguide 6 therefore has here a first end face 81 with an angle of inclination of at least 21°, and a second end face 82 of 15°. The core 22 of the waveguide 6 is bounded in this case by end face 82. The end of the waveguide 5, by contrast, has an end face inclined by only 21°.

Owing to the additional end faces 71 and 81, respectively, which provided the end of in each case one of the waveguides 5 and 6 with a shape that is substantially convex seen from outside, the embodiments of FIGS. 4A, 4B, 5A and 5B render it possible for the cores of the waveguides 5 and 6 to be brought closer to one another, in particular to reduce coupling losses thereby.

FIGS. 6 and 8 likewise show embodiments which, compared with substantially plane end faces, for example in accordance with FIGS. 1A and 1B, render possible a more pronounced coming together of the waveguide cores.

In FIG. 6, the end face 72 of the waveguide 5 is provided with an angle of 21° and the end face 71 of the waveguide 5 is provided with an angle of at least 0°, but in the opposite direction, the result being to produce an end of the waveguide 5 that comes to a tip in a plane. The end of the waveguide 6, by contrast, has only one end face inclined at 15°.

The waveguide 5 of the embodiment shown in FIG. 8 has a first end face 72 with an angle of 21°, and the waveguide 6 has a first end face 81 with an angle of 15°. In addition, the waveguides 5 and 6 each comprise second rounded end faces 71 and 82, respectively, so that the ends of the waveguides 5 and 6 are each of convex shape in a plane.

In the embodiment shown with the aid of FIG. 7, coupling losses are reduced by an adapter 12 which either has a further waveguide 13 or a channel 13 with preferably reflecting walls. Such an adapter 12 can be used to adapt angles of the end faces in a very wide range with low coupling losses and with low retroreflections.

In accordance with a further embodiment, shown in FIG. 9, the waveguide 5 has an end face of convex or bent shape, and waveguide 6 has an end face 7 of concave shape. It may be pointed out that in the case of such designs the inclination of the normals to the end face 7 or 8 is understood here as the inclination of the normals at the point of intersection of the end face 7 or 8 with the respectively assigned optical axis 11.

Referring to FIG. 10, which illustrates a further exemplary embodiment, it may be mentioned that the wave field extends well beyond the waveguide core 21 or 22 into the cladding 3, particularly for weakly guiding waveguides of low numerical aperture such as are customary as monomode fibers. A large portion of the end face therefore influences the shape and the course of the phase surface of an emerging wave field. In order to obtain optimum launch conditions, the invention provides in a practical way that the end face 7 and/or 8 of the waveguide 5 and/or 6 is also of uneven or curved shape, as shown in FIGS. 10. In particular, it is provided that the opposite end faces 7 and 8 are shaped such that the phase surface is maintained when impinging on the waveguide 6 into which the signal is launched again.

It may be pointed out in principle that in the case of all embodiments previously exhibited and discussed the waveguide ends can additionally be coated with an antireflection layer, particularly for the purpose of improved suppression of reflections. Furthermore, such an antireflection layer serves to optimize the transmission of the arrangement. In a particularly advantageous way, this antireflection layer can also influence the effective refractive power, which means that an antireflection layer can be used to adapt the effective refractive index present at an end face.

FIG. 11 shows for this purpose a graphical illustration in which the minimum achievable grinding angle of the waveguide ends as a function of the power reflection of an antireflection layer. A total power reflection of 60 dB was used as basic criterion for the minimum possible angle. It is clear from FIG. 11 that a particularly effective suppression of reflection can be achieved by the combination of ground section or oblique end face and antireflection layer.

FIG. 12 shows a further embodiment, in the case of which each of the waveguides 5 and 6 have two end faces 71 and 72 or 81 and 82, respectively. The angles of inclination of the end faces 72 and 82, in particular, are selected in this case such that when the waveguides 5 and 6 are joined together as indicated by the arrows in FIG. 12, the end faces 72 and 82 can be brought into mutual contact for a defined arrangement of the optical axes of the waveguide cores 21 and 22, and an adjusting guidance function is provided thereby.

| List of Reference Numerals | |
|---|---|
| 1 | Connecting device |
| 2, 21, 22 | Waveguide cores |
| 3 | Waveguide cladding |
| 5, 6 | Waveguides |
| 7, 8, 71, 72, 81, 82 | End faces |
| 9 | Ferrule |
| 11 | Optical axis |
| 12 | Adapter |
| 13 | Channel |

What is claimed is:

1. A connecting device for connecting at least two optical waveguides (5, 6), in the case of which a first optical waveguide (5) is held relative to a second optical waveguide (6), at least one end face (7, 71, 72) of the first waveguide runs obliquely to the optical axis (11) of the first waveguide (5), and at least one end face (8, 81, 82) of the second waveguide (6) runs obliquely to the optical axis of the second waveguide (6), characterized in that the refractive index of at least one light-guiding region of the first optical waveguide (5) differs from the refractive index of a light-guiding region of the second optical waveguide (6), and in that at least one end face (7, 71, 72) of the first optical waveguide (5), and the at least one end face (8, 81, 82) of the second optical waveguide (6) are inclined such that the optical axis of the first and of the second optical waveguides (5, 6) are arranged substantially parallel to one another.

2. The connecting device as claimed in claim 1, in the case of which a wave that can be guided in the first optical waveguide emerges, owing to refraction at the end face (7, 71, 72) of the first optical waveguide (5), from the first optical waveguide (5) at an angle a obliquely to the optical axis (11) of the first optical waveguide (5), and enters the second optical waveguide (6) obliquely to the second optical axis of the second optical waveguide (6) and, owing to refraction at the end face (8, 81, 82) of the second optical waveguide (6), propagates in the second optical waveguide (6) substantially parallel to the optical axis of the second optical waveguide (6).

3. The connecting device as claimed in claim 1, in the case of which the core (2, 21) of the first optical waveguide (5) has a different refractive index than the core (2, 22) of the second optical waveguide (6).

4. The connecting device as claimed in claim 1, in the case of which the spacing of the end face (7, 71, 72) of the first optical waveguide (5) from the end face (8, 81, 82) of the second optical waveguide (6) varies in the direction of the optical axis (11) of the first optical waveguide (5) along a direction perpendicular to this optical axis (11).

5. The connecting device as claimed in claim 1, in the case of which at least one of the optical waveguides (5, 6) comprises an optically amplifying material.

6. The connecting device as claimed in claim 5, in the case of which at least one of the optical waveguides (5, 6) has a region doped with rare-earth elements.

7. The connecting device as claimed in claim 5, in the case of which one optical waveguide (5) comprises a fiber waveguide, and the further optical waveguide (6) comprises an amplifier fiber doped with erbium.

8. The connecting device as claimed in claim 1, in the case of which at least one of the optical waveguides (5, 6) comprises a material which contains quartz glass.

9. The connecting device as claimed in claim 1, in the case of which at least one of the optical waveguides (5, 6) has a material from a group that comprises bismuth oxide-containing glass, tellurite glass, germanium sulfide-containing glass and fluoroaluminate glass.

10. The connecting device as claimed in claim 1, in the case of which the normal to an end face (7) of the first optical waveguide (5) is inclined at 8° to the optical axis of the waveguide (5).

11. The connecting device as claimed in claim 10, in the case of which the normal to an end face (8, 81) of the second optical waveguide (6) is inclined at 21° to the optical axis of the waveguide (6).

12. The connecting device as claimed in claim 1, in the case of which the normal to an end face (7, 72) of the first optical waveguide (5) is inclined at 31° to the optical axis of the waveguide (5).

13. The connecting device as claimed in claim 1, in the case of which the normal to an end face (8, 82) of the second optical waveguide (6) is inclined at 15° to the optical axis of the waveguide (6).

14. The connecting device as claimed in claim 1, in the case of which the normal to an end face (71) of the first optical waveguide (5) is inclined at an angle of less than or equal to 15°, and a further end face (72) is inclined at an angle of less than or equal to 31°, preferably less than or equal to 21°, to the optical axis of the waveguide (5).

15. The connecting device as claimed in claim 1, in the case of which the normal to an end face (72) of the first optical waveguide (5) is inclined at 21° to the optical axis of the waveguide (5), the normal of an end face (82) of the second optical waveguide (6) is inclined at 15°, and a further end face (81) of the second waveguide (6) is inclined at an angle of at least 21° to the optical axis.

16. The connecting device as claimed in claim 1, in the case of which the two end faces (71, 72, 81, 82) of at least one of the two waveguides (5, 6) are arranged at an obtuse external angle to one another.

17. The connecting device as claimed in claim 16, in the case of which the normal to one of the two end faces (71, 72, 81, 82) is inclined at an angle of 21° to the optical axis of the waveguide (5, 6).

18. The connecting device as claimed in claim 16, in the case of which the normal to an end face (7, 71, 72, 8, 81, 82) of the other of the two waveguides (5, 6) is inclined at 15° to the optical axis of the waveguide.

19. The connecting device as claimed in claim 1, in the case of which the waveguides (5, 6) are coupled to one another via an adapter (12).

20. The connecting device as claimed in claim 19, in the case of which the adapter (12) has a channel (13) that couples the waveguide cores (2) to one another, and preferably has reflecting walls.

21. The connecting device as claimed in claim 1, in the case of which the core (2) of the first optical waveguide (5) is laterally offset relative to the core (2) of the second optical waveguide (6).

22. The connecting device as claimed in claim 1, in the case of which at least one end face (7, 71, 72, 8, 81, 82) of at least one of the waveguides (5, 6) is uneven, preferably curved.

23. The connecting device as claimed in claim 1, in the case of which at least one end face 7, 71, 72, 8, 81, 82) of at least one of the waveguides (5, 6) comprises a shape that is selected from the group comprising rounded, concave and convex surfaces.

24. The connecting device as claimed in claim 1, in the case of which the end faces (7, 71, 72, 8, 81, 82) of the optical waveguides are designed so as to permit the phase front to be substantially preserved in a transition of an optical wave from the first into the second waveguide (5, 6).

25. The connecting device as claimed in claim 1, in the case of which the optical axis of the first and of the second waveguides (5, 6), and the normal vectors to the end faces (7, 71, 72, 8, 81, 82) of the waveguides (5, 6) lie substantially in one plane.

26. The connecting device as claimed in claim 1, in the case of which the end faces (7, 71, 72, 8, 81, 82) of at least one of the waveguides (5, 6) are coated with an antireflection layer.

27. The connecting device as claimed in claim 26, in the case of which the refractive index actually present at the end face is changed by the antireflection layer.

* * * * *